United States Patent
Storm

(10) Patent No.: US 7,640,813 B2
(45) Date of Patent: Jan. 5, 2010

(54) PROCESS FOR OPERATING A CORIOLIS MASS FLOW RATE MEASUREMENT DEVICE

(75) Inventor: Ralf Storm, Essen (DE)

(73) Assignee: KROHNE Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 11/734,441

(22) Filed: Apr. 12, 2007

(65) Prior Publication Data

US 2008/0011101 A1    Jan. 17, 2008

(30) Foreign Application Priority Data

Apr. 12, 2006 (DE) .................. 10 2006 017 676

(51) Int. Cl.
    *G01F 1/84* (2006.01)
(52) U.S. Cl. ............................... 73/861.356
(58) Field of Classification Search ............. None
     See application file for complete search history.

(56) References Cited

U.S. PATENT DOCUMENTS

| 5,259,239 | A   |   | 11/1993 | Gaisford |            |
|-----------|-----|---|---------|----------|------------|
| 5,259,250 | A   | * | 11/1993 | Kolpak   | 73/861.355 |
| 5,637,804 | A   | * | 6/1997  | Hansen   | 73/861.357 |
| 5,926,096 | A   |   | 7/1999  | Mattar et al. |       |
| RE36,597  | E   | * | 3/2000  | Agar et al. | 73/861.04 |
| 6,327,914 | B1  |   | 12/2001 | Dutton   |            |
| 6,505,519 | B2  |   | 1/2003  | Henry et al. |        |
| 6,513,393 | B1  |   | 2/2003  | Eckert et al. |       |
| 6,598,488 | B1  | * | 7/2003  | Sutton et al. | 73/861.355 |
| 6,880,410 | B2  | * | 4/2005  | Drahm et al. | 73/861.357 |
| 6,910,366 | B2  |   | 6/2005  | Drahm et al. |        |
| 7,036,355 | B2  |   | 5/2006  | Drahm et al. |        |
| 7,040,181 | B2  |   | 5/2006  | Rieder et al. |       |
| 7,059,199 | B2  | * | 6/2006  | Mattar et al. | 73/861.356 |
| 7,162,915 | B2  |   | 1/2007  | Drahm et al. |        |
| 7,188,534 | B2  | * | 3/2007  | Tombs et al. | 73/861.356 |
| 7,284,449 | B2  |   | 10/2007 | Rieder et al. |       |
| 7,296,484 | B2  |   | 11/2007 | Rieder et al. |       |
| 7,305,892 | B2  | * | 12/2007 | Kourosh  | 73/861.357 |
| 7,357,039 | B2  |   | 4/2008  | Rieder et al. |       |

FOREIGN PATENT DOCUMENTS

DE    44 23 168 A1    1/1996
WO    01/31298 A2     5/2001

* cited by examiner

*Primary Examiner*—Harshad Patel
(74) *Attorney, Agent, or Firm*—David S. Safran; Roberts Mlotkowski Safran & Cole, P.C.

(57) ABSTRACT

A process for operating a Coriolis mass flow rate measurement device, with at least one measurement tube (10) through which a medium flows and which is subjected to vibration excitation that leads to resulting vibrations of the measurement tube (10), a first indicator quantity being used for detection of a multiphase flow. For detection of the multiphase flow, an additional, second indicator quantity that is independent of the first indicator quantity is used. Thus, a process for operating a Coriolis mass flow rate measurement device (1) is attained with which the detection of multiphase flows, especially of two-phase flows, is reliably possible without the need to make assumptions regarding the properties of the individual phases of the flowing medium.

6 Claims, 2 Drawing Sheets

US 7,640,813 B2

PROCESS FOR OPERATING A CORIOLIS MASS FLOW RATE MEASUREMENT DEVICE

BACKGROUND OF THE INVENTION

1. Field of the Invention

Figure 1:
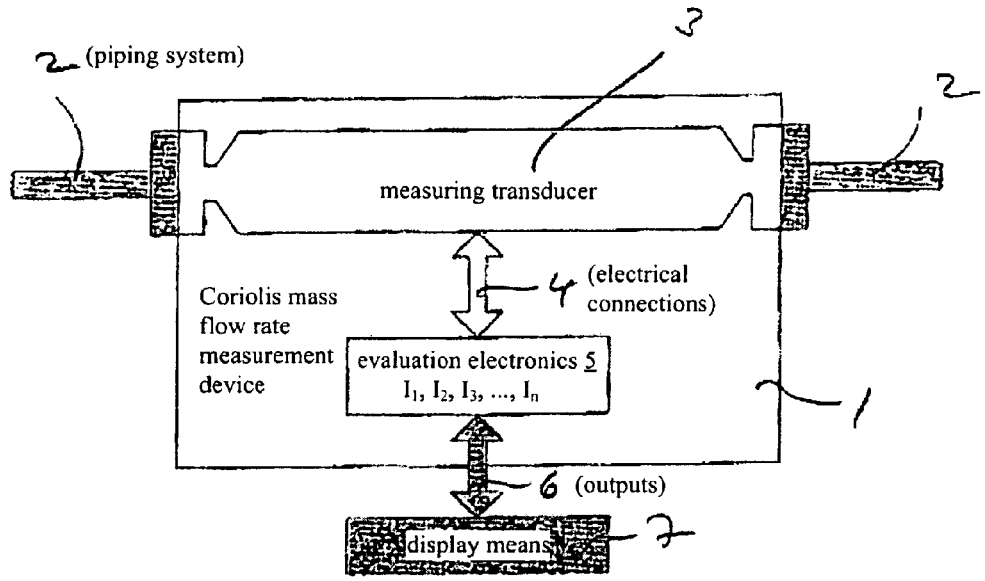

The invention relates to a process for operating a Coriolis mass flow rate measurement device, with at least one measurement tube through which a medium flows and which is subjected to vibration excitation; this leads to resulting vibrations of the measurement tube, a first indicator quantity being used for detection of a multiphase flow.

2. Description of Related Art

Coriolis mass flow rate measurement devices generally have a single measurement tube or a plurality of measurement tubes through which a medium flows with a mass flow rate which is to be determined. In this connection, different arrangements and geometries of measurement tubes are known. Thus, there are, for example, Coriolis mass flow rate measurement devices with a single straight measurement tube and Coriolis mass flow rate measurement devices with two curved measurement tubes.

It is common to these Coriolis mass flow rate measurement devices that the measurement tubes through which the medium flows form a mechanical vibration system which is influenced by the flowing medium. Thus, the density of the medium changes the resonant frequency of the vibration system, while the mass flow rate of the medium changes the form of the vibration. Accordingly, in addition to the mass flow rate, among other things, also the density of the flowing medium can be determined.

Coriolis mass flow rate measurement devices are characterized by high measurement accuracy. Thus, the mass flow rate can be measured with a precision of less than 0.1%. Moreover, with Coriolis mass flow rate measurement devices, in addition to the mass flow rate, other values can be determined which are derived in part from primary measurement values. Examples of these derived values are the volumetric flow rate, the mass amount and volumetric amount, and the concentrations of the flowing medium. Thus, Coriolis mass flow rate measurement devices constitute multivariable measurement devices which are often used not only for a primary measurement task, but in addition can also deliver important secondary diagnosis and quality information about a process.

Information about multiphase flows, such as two-phase flows, especially specifically detection of the occurrence of such a multiphase flow and conclusions about the form of the multiphase flow, have not be reliably available in the past using Coriolis mass flow rate measurement devices. Examples of multiphase flows, specifically of two-phase flows, are gas bubbles in a liquid which can be caused, for example, by cavitation in valves or pumps or intake of air at leaks. Furthermore, one example of a two-phase flow is a system of solids in a liquid, for example, caused by crystallization or sudden detachment of deposits in a piping system through which the medium is flowing. Finally, there is an example of two-phase flows in mixtures of insoluble liquids, therefore in emulsions, which can be caused, for example, by changing of the medium flowing through the piping system.

Conventional approaches to detection of multiphase flows in a Coriolis mass flow rate measurement device are based, for example, on determination of the drive power which is required to obtain mechanical vibrations in a Coriolis mass flow rate measurement device, such as described, for example, in German Patent Application DE 44 23 168 A1. In practice, the quantity "installation factor" has been introduced; it corresponds as a dimensionless amount to the drive power which is necessary to reach a given vibration amplitude. This quantity is designed primarily for assessment of the quality of the installation of the Coriolis mass flow rate measurement device in the piping system. However, gas bubbles in the liquid medium likewise increase the power demand and lead to an increase of the installation factor so that the installation factor can also be used for detection of a multiphase flow.

But, the disadvantage is the fact that this value alone is not sufficient for reliable detection of gas bubbles since, in particular, in addition to the quality of the installation of the Coriolis mass flow rate measurement device also, for example, the viscosity of the medium can have an effect on the power demand of the Coriolis mass flow rate measurement device. In this way, the use of the drive power for detecting a multiphase flow is associated with the danger of faulty detection of such a multiphase flow in the case of a change of the viscosity or in the case of a change of the installation conditions.

A second conventional approach to detecting or determining multiphase flows is based on the use of reference densities, such as described, for example, in U.S. Pat. No. 4,689,989. Here, the density of the multiphase flow is compared to known densities of the individual phases. However, the disadvantage is the necessity of knowing a priori the densities of the individual components of the flowing medium. Thus, this diagnosis can only be implemented in a special process and not in general.

SUMMARY OF THE INVENTION

Thus, it is a primary object of the present invention to devise such a process for operating a Coriolis mass flow rate measurement device with which the detection of multiphase flows, especially of two-phase flows, is reliably possible without the need to make assumptions regarding the properties of the individual phases of the flowing medium.

Proceeding from the initially described process, this object is achieved in that an additional, second indicator quantity independent of the first indicator quantity is used for detection of the multiphase flow.

Therefore, it is provided in accordance with the invention that, for detection of the multiphase flow, two indicator quantities which are independent of one another are used; this means that these indicator quantities depend on external effects in different ways. In this way, the danger of erroneously detecting a multiphase flow is reduced, although only the change of an external variable has taken place which changes the indicator quantity in the same direction as a multiphase flow.

In other words, providing a plurality of indicator quantities can ensure that solely the change of the indicator quantity in the direction which would correspond to the presence of a multiphase flow is still insufficient to confirm the presence of such a multiphase flow. Rather, for at least a second indicator quantity, a corresponding effect must also occur in order to positively detect a multiphase flow. Erroneous display of the presence of a multiphase flow can be drastically reduced in this way.

Basically, the first indicator quantity can originate from a plurality of groups of quantities of the Coriolis mass flow rate measurement device, which groups are different from one another. According to one preferred development of the invention, it is provided that the first indicator quantity is based on a) friction losses within the multiphase flow,
b) inhomogeneity of the multiphase flow,
c) modeling of the nominal behavior of the Coriolis mass flow rate measurement device or
d) transit time effects of the multiphase flow between two detection sites which are spaced apart from one another in the lengthwise direction of the measurement tube for the resulting vibrations and the second indicator quantity is based on another of these quantities a)-d).

According to this preferred development of the invention, the first indicator quantity can, therefore, be selected from four categories that differ from one another, while the second indicator quantity is then selected from another of these categories. In other words, this means that the four aforementioned categories of different quantities, in the sense of the invention, yield indicator quantities which are independent of one another.

Basically, it can be sufficient to use two indicator quantities which are independent of one another for detection of a multiphase flow. However, according to a preferred development of the invention it is provided that at least a third indicator quantity is used for detection of the multiphase flow. In this connection, when a third indicator quantity is used and when other indicator quantities are used, it is fundamentally possible for them to originate from a group which is different from the group of the first indicator quantity and from the group of the second indicator quantity.

While the first indicator quantity and the second indicator quantity in accordance with the invention must be independent of one another, and thus must originate from groups which are different from one another, this is not absolutely necessary for the third and for other indicator quantities, so that the third and other indicator quantities can also originate from those groups from which the first and the second indicator quantity originate.

Basically, the indicator quantities can be formed in any manner from the quantities of the Coriolis mass flow rate measurement device which can be determined as long as fixed rules can be assigned to the indicator quantities, which rules indicate in what direction the indicator quantity must change in order to indicate the presence of a multiphase flow. According to a preferred development of the invention, it is provided that the indicator quantities exhibit a larger value, the more pronounced the multiphase flow.

According to a preferred development of the invention, it is also provided that, to determine a quantity based on friction losses within a multiphase flow, the following is or are evaluated: the drive power necessary for vibration excitation of the measurement tube, the drive amplitude, the resulting vibration amplitude and/or at least one quantity derived from one or more of these quantities. In particular, in this connection, according to a preferred development of the invention, it can be provided that the averages of these quantities are used.

Furthermore, according to another preferred development of the invention, it is provided that a quantity based on the inhomogeneity of the multiphase flow is obtained from the noise of an internal signal of the Coriolis mass flow rate measurement device. This preferred development of the invention is based on the fact that the multiphase flow can be regarded as a stochastic noise process which stochastically disrupts the signals of the Coriolis mass flow rate measurement device.

According to a preferred development of the invention, the internal signal of the Coriolis mass flow rate measurement device is especially the phase difference between two signals which are detected at detection sites spaced apart from one another in the lengthwise direction of the measurement tube for the resulting vibrations, the natural frequency of the measurement tube through which flow takes place, the phase difference between the vibration excitation and the resulting vibrations, the instantaneous amplitude of the drive power per vibration amplitude and/or at least one quantity derived from one or more of these quantities, such as the mass flow rate through the measurement tube and/or the density of the flowing medium. Finally, according to a preferred development of the invention, it is especially provided that the variance, the standard deviation or the difference of the maximum value and the minimum value of a time interval for one or more of these quantities is determined.

According to another preferred development of the invention, the deviation of a detected signal from the signal expected based on modeling is intended for determining a quantity based on modeling of the nominal behavior of the Coriolis mass flow rate measurement device. Here, according to a preferred development of the invention, it is provided especially that the detected signal is a signal of the vibration excitation of the measurement tube, a signal of the resulting vibrations of the measurement tube or/and at least one quantity derived from one or more of these quantities.

Finally, according to another preferred development of the invention, it is provided that, to determine a quantity based on transit time effects of the multiphase flow between two detection sites that are spaced apart from one another in the lengthwise direction of the measurement tube, for the resulting vibrations, the deviation of the computed transit time based on the determined mass flow rate is determined by the transit time determined for the multiphase flow. Thus, according to this preferred development of the invention, a fourth group of indicator quantities is defined which are based on the noise of an inlet-side or outlet-side signal being correlated to one another and therefrom the transit time of the multiphase flow being determined, the latter in turn being compared to the transit time which would result based on the computed mass flow rate. The greater the difference which has been determined in this connection, the greater the characteristic form of the multiphase flow.

The invention is explained in detail below using a preferred embodiment with reference to the accompanying drawings.

DETAILED DESCRIPTION OF THE DRAWINGS

Figure 2:
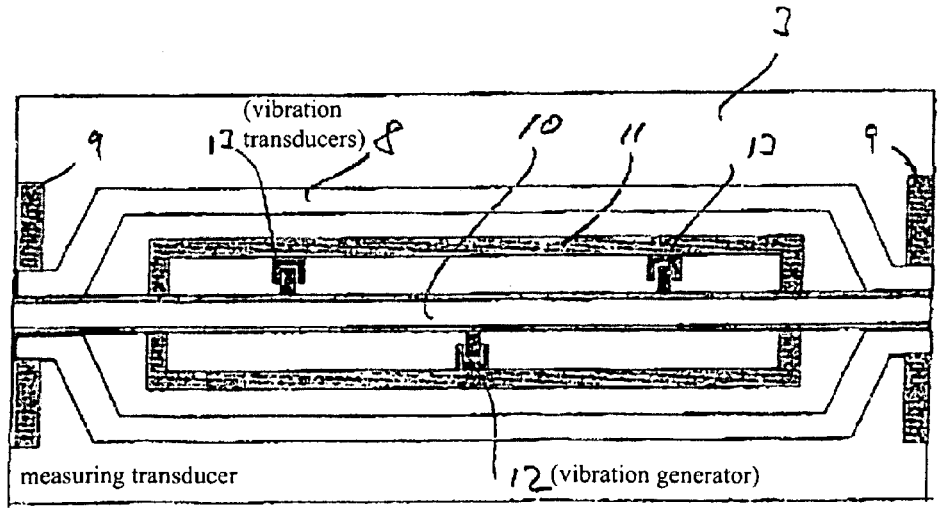
Figure 3:
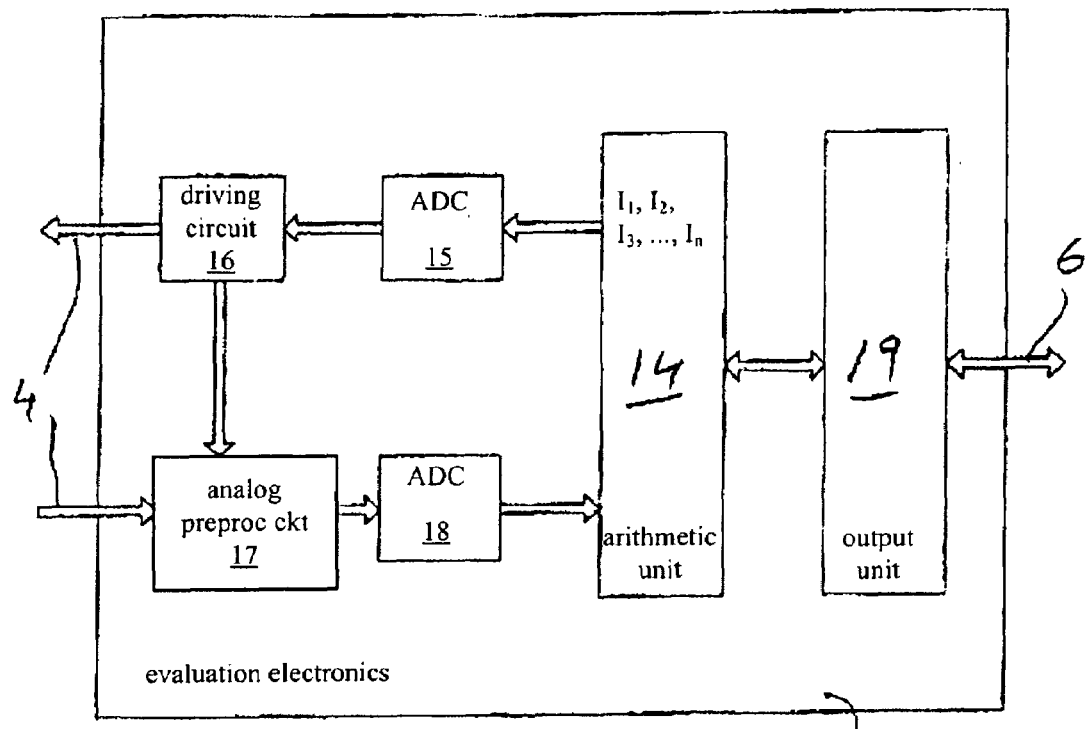
Figure 4:
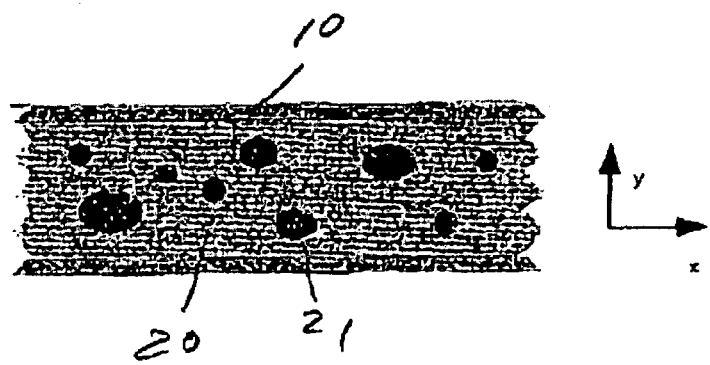

FIG. 1 schematically shows a Coriolis mass flow rate measurement device for use with a process according to a preferred embodiment of the invention, FIG. 2 schematically shows the measuring transducer of the Coriolis mass flow rate measurement device, FIG. 3 schematically shows the evaluation electronics of the Coriolis mass flow rate measurement device, and FIG. 4 schematically shows a two-phase flow in the measurement tube of the Coriolis mass flow rate measurement device.

DETAILED DESCRIPTION OF THE INVENTION

The process in accordance with the invention is based on the linking of two or more indicator quantities in order to detect a multiphase flow. By linking several indicator quantities, reliable detection of a multiphase flow is ensured; this could not be done using a single indicator quantity. This is done as described below:

FIG. 1 shows a diagram of the Coriolis mass flow rate measurement device for use with a process according to a preferred embodiment of the invention. The Coriolis mass flow rate measurement device 1 is installed in a piping system 2 through which the medium flows, with a mass flow rate which is to be measured. The Coriolis mass flow rate measurement device 1 has a measuring transducer 3 which is connected via electrical connections 4 to evaluation electronics 5. The data determined by the evaluation electronics 5 can be output to an external device, such as a display means 7, via outputs 6.

The measuring transducer 3 of the Coriolis mass flow rate measurement device 1 is illustrated in FIG. 2. The measuring transducer 3 has a housing 8 and flanges 9 by means of which it is installed in the piping system 2. The medium with a mass flow rate which is to be measured flows through a single straight measurement tube 10. A vibration generator 12 is provided within a carrier tube 11 to excite the measurement tube 10 into vibration. The resulting vibrations of the measurement tube 10 are detected by two vibration transducers 13.

FIG. 3 shows the evaluation electronics 5 in detail. As already described above, the evaluation electronics 5 are connected via electrical connections 4 to the measuring transducer 3 and communicate via outputs 6 with an external device. The evaluation electronics 5 have an arithmetic unit 14 which undertakes triggering of the vibration generator 12. This triggering is digitally produced and transmitted to a driver circuit 16 via an analog/digital converter 15 which contains elements for power amplification and power matching, interference suppression, filtering and protection for overvoltages. From there, transmission takes place, as already stated, via electrical connections 4.

The signals detected by the vibration transducers 13 are supplied to an analog preprocessing circuit 17 via the electrical connections 4. From there, the signal is routed to the analog/digital converter 18 which relays the digitized signals to the arithmetic unit 14. From these signals, the arithmetic unit 14 then determines the primary measurement values of the Coriolis mass flow rate measurement device 1, such as the mass flow rate and the density of the medium flowing through the measurement tube 10. These values are then relayed to an output unit 19 which, as already stated, communicates with an external device via the outputs 6. The arithmetic unit 14 is also responsible for detection of a multiphase flow according to the preferred embodiment described here, specifically for detection of a two-phase flow.

FIG. 4 is a schematic lengthwise sectional view through a segment of the measurement tube 10 with a two-phase flow. This two-phase flow generally has a carrier medium 20 as the first phase which has irregular inclusions of a second medium 21 as the second phase. One example of this two-phase flow is water as the carrier medium 20 with air bubbles of different size as the inclusions. This two-phase flow consisting of the carrier medium 20 and air inclusions as the second medium is routed in the direction of the x-coordinate through the measurement tube 10 of the Coriolis mass flow rate measurement device 1.

According to the preferred embodiment of the invention described here, a two-phase flow is detected by linking a plurality of indicator quantities, as is stated below. Here, it is critical that the indicator quantities and linking of indicator quantities need not linearly image the two-phase flow. Rather, it is sufficient to define threshold values which, when exceeded, indicate the presence of a two-phase flow. Moreover, a qualitative conclusion about the form of the two-phase flow can be delivered via linkages of the indicator quantities, therefore, for example, about the proportion of air bubbles in the water. Otherwise, optionally, nonlinear behavior of the individual indicator quantities can also be linearized by a suitable choice of the linking of the indicator quantities.

The first group of possible indicator quantities for a two-phase flow is based on friction losses within the two-phase flow. The flow state, as is shown schematically in FIG. 4, leads to an increase of the required drive power. This is based on the fact that the measurement tube 10 in FIG. 4 is excited to vibrations in the direction of the y-coordinate. By these vibrations, the carrier medium 20 and the inclusions of the second medium 21 are also excited to vibrations in the direction of the y-coordinate. Based on the different densities of the two phases, the resulting movements of the two phases are different from one another. Furthermore, relative motion occurs between the carrier medium 20 and the second medium 21. The friction losses which occur due to this relative motion must be additionally applied by the drive; this leads to an increase of the required average drive power compared to a single-phase flow.

These friction losses can be determined differently, for example, by measuring the electrical output with which the vibration generator 12 is operated. Alternatively, a different measure can be used for the magnitude of the drive power, such as the drive amplitude.

The drive power alone is a reliable measure for the losses caused by the two-phase flow only in the case of a constant vibration amplitude of the measurement tube 10. Thus, a change of the friction losses can also lead to a change of the vibration amplitude of the measurement tube 10 when, for example, the drive power is limited by the driver circuit 16. Therefore, it is advantageous to consider the drive power $P_A$ relative to the instantaneous vibration of the measurement tube 10 for determining the friction losses.

This vibration can be determined, for example, by the amplitude or the effective value of a signal of a vibration transducer 13 or by the amplitude or effective value of linking of the signals of several vibration sensors 13. Combining the possible quantities for the drive power $P_A$ and the drive amplitude and the resulting vibration amplitudes yields the first group of indicator quantities. For example, the following values can be used as indicator quantities:

$I_{11} = MW(P_A)/MW$(amplitude of the sum of the vibration sensor signals)

$I_{12} = MW$(amplitude of trigger signal/amplitude of vibration sensor signal)

$I_{13} = MW$(gain of amplitude controller).

The function MW (x) is an arithmetic rule for at least approximate computation of the average value of the argument x.

The indicator quantities of the above described first group alone are not sufficient for reliable detection of the two-phase flow. This is due to the friction losses of the vibrations of the measurement tube 10 not being influenced solely by the two-phase flow. Changes of the temperature in the Coriolis mass flow rate measurement device 1 can also lead to a change of the internal friction losses, for example, at the connecting sites between the measurement tube 10 and the carrier tube 11. A change of the flowing medium, mainly a change of its viscosity, also leads to a change of friction losses.

Therefore, other groups of indicator quantities are provided. A second group of indicator quantities is based on the inhomogeneity of the two-phase flow. As is shown in FIG. 4, the distribution and form of the inclusions of the second medium 21 in the carrier medium 20 are nonuniform, i.e., the size and number of inclusions of the second medium 21 in the measurement tube 10 at different observation instants are different, even if the time averages of size and quantity are constant. A two-phase flow can thus be regarded as a stochastic noise process which stochastically disrupts the signals of the Coriolis mass flow rate measurement device 1.

The second group of indicator quantities for the two-phase flow is thus obtained from the noise of internal signals of the Coriolis mass flow rate measurement device 1. In this connection possible signals which can be evaluated for use as indicator quantities are all signals which are directly or indirectly linked to the medium to be measured, such as 1. The mass flow rate m and the phase difference $\Delta\phi$ between the signals detected by the vibration transducers 13:

$$I_{21}=R(m).$$

Since the mass flow rate is determined from the phase difference between the signals detected by the two vibration transducers 13, these two quantities are equivalent with respect to the detection of noise originating from a medium. Since the mass in the measurement tube 10 changes depending on the stochastic distribution of the phases, the mass flow rate through the measurement tube 10 likewise changes depending on the two-phase flow.

2. Density $\rho$ or frequency $\omega_A$ of the drive signals:

$$I_{22}=R(\rho).$$

Since the density is determined from the frequency of the drive signals, these two quantities are equivalent with respect to detection of noise originating from a medium. The mass in the measurement tube 10 changes depending on the stochastic distribution of the phases, and thus, the density in the measurement tube 10 likewise changes.

3. The phase difference $\phi_{AS}$ between the excitation signals and the resulting vibration sensor signals:

$$I_{23}=R(\phi_{AS}).$$

According to the preferred embodiment of the invention described here, the measurement tube 10 is operated in mechanical resonance. This is achieved via control of the phase difference $\phi_{AS}$ between the excitation signals and the sum of the detected vibration signals. In resonance the phase difference $\phi_{AS}$ is equal to zero. If the density in the measurement tube 10 changes stochastically as a result of a two-phase flow, the mechanical resonant frequency changes. Until the control sets the frequency of excitation to the new resonant frequency, a likewise stochastic change of the phase difference $\phi_{AS}$ occurs.

4. Instantaneous amplitude of the drive power $P_A$ per vibration amplitude $\hat{S}$:

$$I_{24} = R\left(\frac{P_A}{\hat{S}}\right).$$

As was described above, the two-phase flow increases the average demand for drive power per average vibration amplitude reached. This leads to the indicator quantities of the above described group. Only the stochastic change of these quantities or the stochastic change of the quotient of the instantaneous drive power and instantaneous vibration amplitude are added. In contrast to the average values which are used for the indicator quantities from the first group, the change of the instantaneous values is, for example, not dependent on the average viscosity of a single-phase medium.

In this connection, the function R(x) constitutes a suitable arithmetic rule for determining a measure for the noise of the signal x. This can be determined in the arithmetic unit 14, for example, by determining the 1. variance
2. standard deviation or
3. difference of the maximum and minimum value in a time interval of the respective signal x.

Here, it must be watched that the noise in the respective signal can differ from the added noise by the two-phase flow based on filtering by 1. the mechanical vibration system comprised of the measurement tube 10 and the carrier tube 11,
2. the transmission properties of the vibration generator 12 and vibration transducer 13 used,
3. the signal chain comprised of the digital/analog converter 15, the driver circuit 16, the analog processing circuit 17 and the analog/digital converter 18 and
4. processing in the arithmetic unit 14 depending on where the signal x is tapped.

A third group of indicator quantities is based on modulation of the nominal behavior of the Coriolis mass flow rate measurement device 1. The Coriolis mass flow rate measurement device 1 which is described here is operated in high quality mechanical resonance so that the signals detected by the vibration transducers 13 in the case of a single-phase medium are single-frequency sinusoidal signals. The corresponding applies to the signals of the vibration excitation when they are obtained directly from the signals of the vibration transducer 13.

With knowledge of the nominal form of the signals, a signal model can be prepared. Comparison of the computed signals of the signal model with the measured signals then enables computation of indicator quantities for the two phase flows. Thus, for example, the average difference of a measured signal x and a signal $x_{nom}$ which is expected based on the model is a measure of the interference caused by the two-phase flow: $I_{31}=MW(|x-x_{nom}|)$.

In this connection, the signal is one of the signals from the vibration transducers 13, the signal of the vibration excitation or a combination of these signals.

Alternatively, the nominal vibration behavior of the Coriolis mass flow rate measurement device 1 can be described by a model. This model can be identified via conventional processes for parameter estimation. In this connection, the actually measured signals $\underline{x}$ and signals of vibration excitation $\underline{u}$ of the Coriolis mass flow rate measurement device 1 are used to determine, for example, the parameters of the model M by means of the least squares process. The residues determined in this parameter estimation are a measure of the deviation of the model from the measured values. If the model describes the nominal behavior of the Coriolis mass flow rate measurement device without two-phase flows, the residues in the case of an existing two-phase flow are an indicator quantity:

$$I_{32}=\text{Residues}(\underline{x}, \underline{u}, ^M)$$

With respect to the residues, reference is made to the graduate paper "Model-supported self-diagnosis of process sensors", Kourosh Kolahi, Christian-Albrechts-Universitaet zu Kiel, 2001.

The modulation of the Coriolis mass flow rate measurement device 1 can also be expanded such that the two-phase flow is contained in the model. This is even possible when the exact functional relationship of the interaction of the two-phase flow with the Coriolis mass flow rate measurement device 1 is unknown. The two-phase flow can be regarded as the influencing variable in the model of the Coriolis mass flow rate measurement device 1 which is determined with an observer of the influencing variable. With respect to this observer of an influencing variable, reference is made to the *Handbook of Control Engineering*, Lutz, H.; Wendt, W. Verlag Harri Deutsch, 2003. In this way, the two-phase flow is described by the parameter $\underline{p}$ of the model M which can be used as the indicator quantity:

$$I_{33}=\underline{p}(\underline{x}, \underline{u}, M).$$

Another possibility involves analysis of the spectrum of the signals detected by the vibration transducers 13. In the design of the Coriolis mass flow rate measurement device 1, resonant frequencies and qualities of the natural forms of the measurement tube 10 are established. The effects of mass flow rate, density and temperature and the signal-noise ratios of the vibration transducers 13 used and of the signal chain consisting of the analog processing circuit 17 and the analog-digital circuit 18 are known. Thus, in the operation of the Coriolis mass flow rate measurement device 1 for the measured process conditions a nominal spectrum of the detected signals can be established. The deviation from this spectrum or the deviation in a suitable partial frequency range of the spectrum is an indicator quantity for the noise due to the two-phase flow:

$$I_{34} = MW\left(\left|\sum_{i=1}^{n} DFT(x, \omega_i) - \sum_{i=1}^{n} DFT\left(\underline{P}, x_{nom}, \omega_i\right)\right|\right).$$

In this connection, for example, a discrete Fourier transform (DFT) can be used to determine the spectrum. DFT (x, $\omega_i$) is the value at the frequency $o_i$ for the signal x, DFT ($\underline{P}$, $x_{nom}$, $\omega_i$) is the value of the nominal spectrum computed as the DFT at the frequency $o_i$ for the nominal signal $x_{nom}$ and the current process conditions $\underline{P}$. Here, the signal x can also be a signal from one of the vibration transducers 13, the signal of the vibration excitation or a combination of these signals.

A fourth group of indicator quantities is based on the transit time effects of the multiphase flow between two detection sites spaced apart from one another in the lengthwise direction of the measurement tube 10 for the resulting vibrations, here, therefore, given by the two vibration transducers 13. Thus, at least one signal $x_{in}$ of the vibrations in the inlet-side half of the measurement tube 10 and a signal $x_{out}$ of the vibrations in the outlet side half of the measurement tube 10 are available. The noise of the individual signal or of the linking of the signals has already been used in the second group of indicator quantities. In addition, the noise of the inlet side signal can be correlated to the noise of the outlet-side signal and the transit time of the two-phase flow between the two vibration transducers 13 can be determined therefrom. From the flow velocity v of its medium in the measurement tube 10, computed from the detected mass flow rate, the transit time of the medium between the vibration transducers 13 can likewise be determined. By comparing these transit times another indicator quantity is obtained which is independent of the noise which is acting at the same time on the two vibration transducers:

$$I_{41}=f(\text{transit time}(_{in}, x_{out}), \text{transit time}(v)).$$

In this connection, the function f(x) is an arithmetic rule which yields a large value when the difference of the two transit times is small, and yields a small value when the difference between the two transit times is large. This can be achieved, for example, by inversion of the amount of the difference of the transit times.

The indicator quantities $I_{11}$ to $I_{41}$ all exhibit a respective value which is greater, the more pronounced the two-phase flow in the Coriolis mass flow rate measurement device 1. However, an individual indicator quantity can have cross sensitivities against other interference of the Coriolis mass flow rate measurement device 1. Thus, for example, the indicator quantities of the first group are also influenced by the viscosity of the flowing medium. The indicator quantities of the second group and the third group can be influenced by vibrations or pump pulsations. The indicator quantities of the fourth group can be influenced by the great difference in transit time of the carrier medium 20 and the inclusions from the second medium 21. In order to ensure reliable detection of the two-phase flow, at least two indicator quantities are combined into a common value.

According to the preferred embodiment of the invention described here, linking of the indicator quantities takes place such that the individual indicator quantities are weighted in order to deliver a larger value, the greater the amplitudes of the community of indicator quantities used. Amplitudes of individual indicator quantities alone, for example, caused by the above described cross sensitivities, should not cause a major deflection.

This yields a value for the two-phase flow $$ZPS=g(I_{11}, \ldots, I_{nm}).$$

In this connection, the function g( ) constitutes a suitable arithmetic rule which links the indicator quantities to one another such that the ZPS value is greater, the more pronounced the two-phase flow.

Examples for suitable linkage are sums of weighted powers $$ZPS=\alpha_{11} \cdot I_{11}{}^{b11}+ \ldots +\alpha_{nm} \cdot I_{nm}{}^{bnm}$$

or products of powers $$ZPS=I_{11}{}^{b11} \cdot \ldots \cdot I_{nm}{}^{bnm}$$

or mixed forms thereof $$ZPS=\alpha_{11} \cdot I_{11}{}^{b11}+ \ldots +\alpha_{uv} \cdot I_{uv}{}^{buv}+\alpha_{xy} I_{xy}{}^{b11} \ldots$$
$$\cdot I_{kl}{}^{b11}+ \ldots +\alpha_{\alpha\beta} I_{\alpha\beta}{}^{b\alpha\beta} \cdot \ldots \cdot I_{K\lambda}{}^{bK\lambda}.$$

In addition, the formula g( ) can provide for linearization and/or scaling so that the ZPS value grows linearly with the state variable of the two-phase flow. Examples of these state variables for describing a two-phase flow are the mass and volumetric ratios of the two phases.

However, the linking can also be a complex arithmetic rule, given, for example, by a neural network or fuzzy logic algorithm. Threshold values are also possible which must be exceeded by individual indicator quantities before the indicator quantities are linked to one another. When the threshold values are not reached the ZPS value would be fixed, for example, ZPS=0.

In the linking of the indicator quantities, the procedure can also proceed such that several indicator quantities from a common group are used at the same time. Thus, for example the resonant frequency and therefore the controlled phase difference $f_{AS}$ are much more quickly variable than the vibration amplitude $\hat{S}$. In the arithmetic unit 15, this is conventionally satisfied by the respective signal processing and the control circuit for the phase amplitude working with different time constants. In this way, two-phase flows, for example, depending on the flow velocity or depending on the distribution and number of inclusions of the second medium 21, can act differently on the indicator quantities $I_{23}$ and $I_{24}$. With simultaneous use of the two indicator quantities, thus reliable detection can be done via a wide range of two-phase flows.

In general, the reliability of detection rises by expanding the linking by other independent indicator quantities. However, with water as the carrier medium 20 with inclusions of air as the second medium 21, the value of the ZPS can be successfully determined via simple linking:

$$ZPS = I_{13} \cdot I_{23}$$

Research has shown that this linking is adequate for a measuring transducer 3 with a single straight measurement tube 10 for reliable detection of a two-phase flow.

What is claimed is:

1. Process for operating a Coriolis mass flow rate measurement device, with at least one measurement tube through which a medium flows, comprising the steps of:
   subjecting the at least one measurement tube to vibration excitation leading to vibrations of the measurement tube,
   using both a first indicator quantity and an additional, second indicator quantity that is independent of the first indicator quantity for detection of multiphase flow,
   wherein the first indicator quantity is based on one of
   a) a quantity based on friction losses within the multiphase flow, wherein to determine a quantity based on friction losses within a multiphase flow, at least one value from the value of drive power necessary for producing vibration excitation of the at least one measurement tube, drive amplitude, resulting vibration amplitude and at least one quantity derived from at least one of said values is evaluated,
   b) a quantity based on inhomogeneity of the multiphase flow, wherein a quantity based on the inhomogeneity of the multiphase flow is obtained from noise of an internal signal of the Coriolis mass flow rate measurement device and wherein the internal signal of the Coriolis mass flow rate measurement device is at least one value from the values of:
   a phase difference between two signals detected at detection sites spaced apart from one another in the lengthwise direction of the at least one measurement tube for the resulting vibrations, the natural frequency of the at least one measurement tube through which flow takes place, a phase difference between the vibration excitation and resulting vibrations, an instantaneous amplitude of drive power per vibration amplitude and at least one quantity derived from at least one of said values,
   c) a quantity based on modeling of the nominal behavior of the Coriolis mass flow rate measurement device, wherein the deviation of a detected signal from a signal which is expected based on modeling is used for determining one of said quantities based on modeling of the nominal behavior of the Coriolis mass flow rate measurement device, and
   d) a quantity based on transit time effects of the multiphase flow between two detection sites which are spaced apart from one another in the lengthwise direction of the at least one measurement tube for the resulting vibrations, wherein to determine such a quantity, the deviation of a computed transit time for the resulting vibrations based on the determined mass flow rate is determined by the transit time determined for the multiphase flow, and
   wherein the second indicator quantity is based on another of said quantities a)-d).

2. Process in accordance with claim 1, wherein said at least one quantity derived from at least one of said values is at least one the mass flow rate through the measurement tube and the density of the flowing medium.

3. Process in accordance with claim 2, wherein one of the variance, the standard deviation or the difference between a maximum value and a minimum value of a time interval is determined for at least one of said values.

4. Process in accordance with claim 1, wherein the detected signal is a signal that represents a characteristic from one of the vibration excitation of the measurement tube, the resulting vibrations of the measurement tube and at least one quantity derived from at least one of the characteristics represented by said detected signal.

5. Process in accordance with claim 1, wherein at least one third indicator quantity is used for detection of the multiphase flow.

6. Process in accordance with claim 1, wherein the indicator quantities ach exhibit a value that is larger, the more pronounced the multiphase flow.

* * * * *